Figure 1:
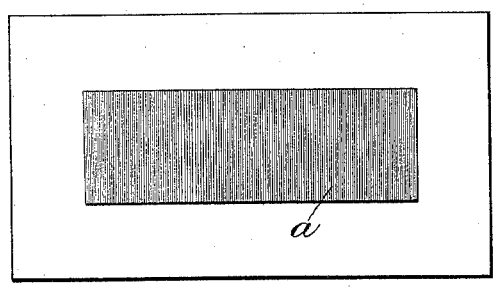

(No Model.)

J. JACOBSON.
METHOD OF MAKING IRIDESCENT SURFACED ARTICLES.

No. 467,661. Patented Jan. 26, 1892.

Witnesses
Jas. J. Maloney
John McDonald

Inventor,
John Jacobson
by Jn. P. Livermore
Atty.

UNITED STATES PATENT OFFICE.

JOHN JACOBSON, OF BOSTON, MASSACHUSETTS.

METHOD OF MAKING IRIDESCENT-SURFACED ARTICLES.

SPECIFICATION forming part of Letters Patent No. 467,661, dated January 26, 1892.

Application filed March 19, 1891. Serial No. 385,637. (No model.)

*To all whom it may concern:*

Be it known that I, JOHN JACOBSON, of Boston, county of Suffolk, State of Massachusetts, have invented an Improvement in the Method of Making Iridescent-Surfaced Articles, of which the following description, in connection with the accompanying drawings, is a specification, like letters on the drawings representing like parts.

The object of my invention is to produce articles having an iridescent surface adapted for use as buttons or for other articles which may be made more ornamental by having a surface that is iridescent or capable of decomposing the light reflected from them.

It is well known that the iridescence or decomposition of light produced by mother-of-pearl, for example, is caused by minute striations or substantially parallel lines or ridges which naturally exist on the surface, and a similar decomposition of light is produced by an artificially-prepared optical surface, sometimes called a "grating," which is made by engraving numerous fine parallel lines upon a suitable surface. Such lines have to be carefully made, and the optical gratings which have been heretofore used for producing this phenomenon of dispersion or decomposition of light have been very expensive, it being necessary to rule or engrave each surface with great care by special appliances.

The present invention is based on the discovery that an engraved grating can be employed as a die or form, from which surfaces having the same optical effect can be produced directly at a very moderate expense and without injury to the original form, which may thus be used to produce an indefinite number of articles having the desired iridescent surface.

The specific manner of obtaining the required surface from the engraved die depends largely upon the nature of the article to which the surface is to be applied. When the said article is composed of plastic material or material that is plastic in some stages of its manufacture—as, for example, hard rubber or celluloid—it may be caused to receive the striated light-dispersing surface by being pressed against the surface of the die, or such striations may be produced upon a metallic surface by stamping the metal with the die, so as to impress the grooves and ridges in the surface of the piece of metal that is stamped.

Figure 2:
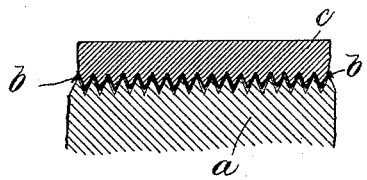

The specific mode which I have followed for producing buttons or similar articles which may be used as a substitute of mother-of-pearl, although giving a more brilliant iridescence, is illustrated in the drawings as follows:

Figure 1 is a plan view of an optical grating having a conventional representation of its ruled surface, and Fig. 2 a longitudinal sectional view of a portion thereof representing the surface of the grating greatly magnified and also illustrating the formation of a grating from the original ruled grating as a form or die.

In producing gratings in accordance with this invention an optical grating $a$ is produced in the usual manner by having its surface ruled or engraved with fine parallel lines sufficiently closely ruled to produce the desired color decomposition of light. In order to produce a similar light-dispersing surface $b$ (see Fig. 2) on any piece of material or article $c$ that it is desired to have iridescent, the said article $c$ is pressed firmly against the striated surface of the grating $a$, or said grating is stamped or pressed against the article $c$ so that the surface of the latter is provided with ridges and grooves or lines which are a counterpart of those on the grating $a$, and consequently have the same effect in decomposing the light that falls upon the said surface $b$, when the article is removed from the die, or, in other words, in giving said article $c$ a striated or iridescent surface. When the said article $c$ is of soft metal, it can be caused to receive the iridescent surface by direct pressure of the surface of the die, and when the article is of plastic material—such, for example, as celluloid or hard rubber—the striations may be impressed in its surface from the striated surface of the die $a$ when said material is in plastic condition, or, if the article $c$ has been previously hardened, it may generally be made sufficiently plastic to receive the striations from the surface of the die by having the die somewhat warm when the material is pressed against it. In some cases the striated surface may be transferred directly to the surface of a transparent material, in which case the striations will disperse the light transmitted through the article, causing the dispersion of the transmitted light.

I claim—

That improvement in the art or method of producing iridescent articles which consists in forming the necessary striations upon a light-reflecting or light-transmitting body by an impression on such body from the surface of a form or die having a ruled or engraved striated light dispersing or decomposing surface, substantially as described.

In testimony whereof I have signed my name to this specification in the presence of two subscribing witnesses.

JOHN JACOBSON.

Witnesses:
   Jos. P. Livermore,
   M. E. Hill.